United States Patent [19]

Nakagawa et al.

[11] Patent Number: 5,026,583
[45] Date of Patent: Jun. 25, 1991

[54] PROCESS FOR PREPARATION OF RUBBER LAMINATES

[75] Inventors: Takashi Nakagawa, Kawasakishi; Osamu Sugimoto, Kawasaki, both of Japan

[73] Assignee: Nippon Zeon Co., Ltd., Tokyo, Japan

[21] Appl. No.: 231,429

[22] Filed: Aug. 12, 1988

[30] Foreign Application Priority Data

Aug. 14, 1987 [JP] Japan .................................. 62-202849
Apr. 27, 1988 [JP] Japan .................................. 63-105187

[51] Int. Cl.$^5$ .............................................. B29D 22/00
[52] U.S. Cl. ................................ 428/36.8; 156/244.13; 156/307.1; 428/36.91; 428/413; 523/451
[58] Field of Search ......................... 156/307.1, 244.13; 428/413, 36.8, 36.91; 523/451

[56] References Cited

U.S. PATENT DOCUMENTS 4,343,861  8/1982  Stivers ................................. 428/413

FOREIGN PATENT DOCUMENTS 58-109786  6/1983  Japan ................................. 428/36.8

*Primary Examiner*—John J. Gallagher
*Attorney, Agent, or Firm*—Armstrong, Nikaido, Marmelstein, Kubovcik & Murray

[57] ABSTRACT

Disclosed is a process for the preparation of rubber laminates, according to which a rubber laminate having a high bonding strength can be obtained by contacting an uncured composition A comprising a fluororubber and a metal oxide with an uncured composition B comprising an epichlorohydrin rubber and a phosphonium salt represented by the following general formula:

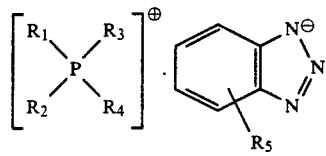

wherein $R_1$, $R_2$, $R_3$ and $R_4$ each stand for a hydrocarbon residue having 1 to 20 carbon atoms, which may be substituted, with the proviso that up to three of $R_1$, $R_2$, $R_3$ and $R_4$ may be a primary, secondary or tertiary amino group of a fluoroalkyl group, and $R_5$ stands for a hydrogen atom or an alkyl group having 1 to 20 carbon atoms, and curing the uncured compositions.

24 Claims, No Drawings

PROCESS FOR PREPARATION OF RUBBER LAMINATES

BACKGROUND OF THE INVENTION

The present invention relates to a process for the preparation of rubber laminates. More particularly, the present invention relates to a process for the preparation of rubber laminates, which comprises contacting a fluororubber containing specific compounding additives with an epichlorohydrin rubber, and bonding them by curing.

Recently, an increasing importance is attached to the resistance to alcohol-mixed gasoline and sour gasoline as the characteristics required of fuel hoses.

A fluororubber is excellent in the resistance to heat, oil, solvent and chemicals, and is used as a rubber excellent in the resistance to alcohol-mixed gasoline and sour gasoline.

Although the fluororubber has these excellent properties, it is more expensive that other rubbery materials such as an acrylonitrile/butadiene rubber and an epichlorohydrin rubber and is defective in that the cold resistance is poor.

Accordingly, a material formed by laminating a layer of a fluororubber composition having the above-mentioned excellent characteristics on a layer of an ordinary rubber composition attracts attention. However, the fluororubber can not be bonded by curing to an epichlorohydrin rubber according to customary procedures, or the bonding force is very weak. Therefore, any laminate having a high bonding strength has not been obtained.

As the means for improving the curing bonding force to a fluororubber, there have been proposed a process in which calcium oxide, an epoxy compound, an aldehydeamine or a 1,8-diazabicyclo[5,4,0]undecene salt of a carboxylic acid is incorporated in an epichlorohydrin rubber and the rubber is tightly cure-bonded to the fluororubber (see Japanese Patent Publication No. 61-29619), a process in which a 1,8-diazobicyclo[5,4,-0]undecene salt of a carboxylic acid is incorporated in an epichlorohydrin rubber and/or a fluororubber (see Japanese Patent Publication No. 60-33663), a process in which a blend of a fluororubber with a small amount of NBR is cure-bonded to an epichlorohydrin rubber (see Japanese Patent Publication No. 60-6238), a process in which red lead and 2-mercaptoimidazoline are added to an epichlorohydrin rubber, to which at least one compound selected from the group consisting of calcium oxide, calcium hydroxide, magnesium oxide and magnesium hydroxide is further added, and the epichlorohydrin rubber composition is cure-bonded to a fluororubber or in which red lead, 2-mercaptoimidazoline and hexamethylenediamine carbamate are incorporated in an epichlorohydrin rubber, to which at least one compound selected from the above-mentioned group is further added, and the epichlorohydrin rubber composition is cure-bonded to a fluororubber (see Japanese Patent Publication No. 59-35787), a process in which a common curing system is incorporated in an epichlorohydrin rubber and a fluororubber (see Japanese Patent Publication No. 59-38896), and a process in which calcium hydroxide and a fluorinated surface active agent are incorporated in an epichlorohydrin rubber and the epichlorohydrin rubber composition is cure-bonded to a fluororubber (see Japanese Patent Application Kokai Publication No. 61-101553).

According to these processes, however, it is impossible to bond a fluororubber firmly to an epichlorohydrin rubber by curing, or the properties of the formed laminate are adversely influenced.

SUMMARY OF THE INVENTION

It is a primary object of the present invention to provide a process for preparing a rubber laminate having a strong bonding force by cure-bonding a fluororubber to an epichlorohydrin rubber.

Another object of the present invention is to provide a process in which a fluororubber is cure-bonded to an epichlorohydrin rubber without adverse influences on the properties of the formed laminate.

In accordance with the present invention, these objects can be attained by contacting an uncured composition comprising a fluororubber and a metal oxide (hereinafter referred to as "uncured composition A") with an uncured composition comprising an epichlorohydrin rubber and a phosphonium salt represented by the following general formula (hereinafter referred to as "uncured composition B"), and curing the uncured compositions A and B:

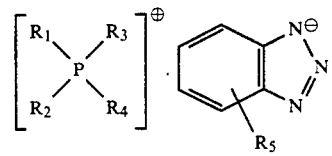

wherein $R_1$, $R_2$, $R_3$ and $R_4$ each stand for a hydrocarbon residue having 1 to 20 carbon atoms, which may be substituted, with the proviso that up to three of $R_1$, $R_2$, $R_3$ and $R_4$ may be primary, secondary or tertiary amino group or a fluoroalkyl group, and $R_5$ stands for a hydrogen atom of an alkyl group having 1 to 20 carbon atoms.

DETAILED DESCRIPTION OF THE PREFERRED EMBODIMENTS

As the fluororubber used for the uncured composition A in the present invention, there can be mentioned homopolymer rubbers of fluorine-containing unsaturated monomers such as vinylidene fluoride, hexafluoropropene, tetrafluoroethylene, pentafluoropropene, trifluoroethylene, trifluorochloroethylene, vinyl fluoride, perfluoromethyl vinyl ether and perfluoroethyl vinyl ether, copolymer rubbers of these monomers and copolymer rubbers of these monomers with other copolymerizable monomers such as olefins, for example, ethylene and propylene.

A vinylidene fluoride/hexafluoropropene binary copolymer rubber and a vinylidene fluoride/hexafluoropropene/tetrafluoroethylene terpolymer rubber are especially preferred as the fluororubber.

CaO, MgO, PbO, $Pb_3O_4$, BaO and $Al_2O_3$ can be used as the metal oxide in the uncured composition A. MgO is especially preferred.

The metal oxide is incorporated in an amount of 1 to 30 parts by weight per 100 parts by weight of the fluororubber, and the amount of the metal oxide is appropriately determined according to the composition of the fluororubber and the kind of the compounding additive to be incorporated into the fluororubber.

This metal oxide can be incorporated not only in the uncured composition A but also in the uncured composition B described hereinafter. In this case, preferably MgO is added in order to enhance the bonding strength of the rubber laminate. The metal oxide is incorporated in an amount of 0 to 50 parts by weight or, more preferably, 3 to 30 parts by weight, per 100 parts by weight of the epichlorohydrin. A rubber laminate having a high bonding strength can be obtained.

As typical instances of the epichlorohydrin rubber used for the uncured composition B, there can be mentioned epichlorohydrin homopolymer rubbers and copolymer rubbers of epichlorohydrin with other epoxides.

As specific examples of the first group of the copolymer rubber, there can be mentioned an epichlorohydrin/ethylene oxide copolymer rubber, an epichlorohydrin/allyl glycidyl ether copolymer rubber and an epichlorohydrin/ethylene oxide/allyl glycidyl ether rubber. In general, the copolymer rubber of the first group comprises 35 to 98 mole % of epichlorohydrin, 0 to 60 mole % of ethylene oxide and 0 to 15 mole % of allyl glycidyl ether.

As specific examples of the copolymer rubber of the second group, there can be mentioned an epichlorohydrin/propylene oxide copolymer rubber, an epichlorohydrin/propylene oxide/allyl glycidyl ether terpolymer rubber and an epichlorohydrin/propylene oxide/ethylene oxide/allyl glycidyl ether quaternary copolymer. In general, the copolymer rubber of the second group comprises 10 to 60 mole % of epichlorohydrin, 30 to 90 mole % of propylene oxide or a mixture of propylene oxide and ethylene oxide (in case of the mixture, it is preferred that the molar ratio of propylene oxide to ethylene oxide be at least 1) and 0 to 15 mole % of allyl glycidyl ether.

The phosphonium salt used in the uncured composition B in the present invention is represented by the following general formula:

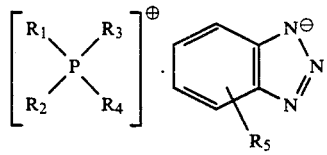

wherein $R_1$, $R_2$, $R_3$ and $R_4$ each stand for a hydrocarbon residue having 1 to 20 carbon atoms, which may be substituted, with the proviso that up to three of $R_1$, $R_2$, $R_3$ and $R_4$ may be a primary, secondary or tertiary amino group or a fluoroalkyl group, and $R_5$ stands for a hydrogen atom or an alkyl group having 1 to 20 carbon atoms.

As the hydrocarbon residue constituting $R_1$, $R_2$, $R_3$ and $R_4$, there can be mentioned alkyl groups such as methyl, ethyl, butyl, ethylhexyl and dodecyl groups, cycloalkyl groups such as a cyclohexyl group, aralkyl groups such as benzyl and methylbenzyl groups, and aryl and substituted aryl groups such as phenyl, naphthyl and butylphenyl groups. As the secondary and tertiary amino groups in the primary, secondary and tertiary amino groups, there can be mentioned methylamino, ethylamino, anilino, dimethylamino and diethylamino groups, and as the fluoroalkyl group, there can be mentioned trifluoromethyl, tetrafluoropropyl and octafluoropentyl groups. As the group $R_5$, there can be mentioned alkyl groups such as methyl, ethyl, butyl, ethylhexyl and dodecyl groups.

As specific examples of the phosphonium salt, there can be mentioned tetrabutyl-, tetraoctyl-, methyltrioctyl-, butyltrioctyl-, phenyltributyl-, benzyltributyl-, benzyltricyclohexyl-, benzyltrioctyl-, butyltriphenyl-, tetraphenyl-, diphenyldi(diethylamino)-, phenylbenzylidi(dimethylamino)-, phenylbenzylidi-(diethylamino)-, trifluoromethylbenzyl- and tetrafluoropropyltrioctylphosphonium benzotriazolates and tolyltriazolates.

The phosphonium salt is used in an amount of 0.5 to 10 parts by weight per 100 parts by weight of the epichlorohydrin rubber.

If the amount of the phosphonium salt is smaller than 0.5 part by weight per 100 parts by weight of the epichlorohydrin rubber, any rubber laminate having a good bonding strength cannot be obtained. If the amount of the phosphonium salt exceeds 10 parts by weight per 100 parts by weight of the epichlorohydrin rubber, the curing speed of the epichlorohydrin rubber is drastically reduced.

Known compounding additives such as a crosslinking agent, a crosslinking promotor, a reinforcer, for example, carbon black or silica, a filler, a softener, a plasticizer, an antioxidant, a stabilizer and a processing assistant can be incorporated in the uncured rubber compositions A and B according to need.

In the present invention, the uncured compositions A and B are separately kneaded according to a known method and molded into an arbitrary shape, for example, a sheet having an appropriate thickness.

Then, the compositions A and B are contacted with each other in an uncured state, and they are then cured to obtain a rubber laminate. The curing method is not particularly critical. For example, compression curing is carried out by using a hot press or curing can. Moreover, there can be adopted a method in which a laminate tube is formed by two-layer extrusion of the compositions A and B and the laminate tube is subjected to compression curing by using a curing can.

Hot pressing is ordinarily carried out at a temperature of 140° to 200° C. under a pressure of 20 to 150 kg/cm$^2$ for 5 to 60 minutes.

When a curing can is used, compression curing is ordinarily carried out at a temperature of 130° to 180° C. under a pressure of 1.8 to 9.1 kg/cm$^2$ for 20 to 120 minutes.

If the obtained laminate is heat-treated (post-cured), the primary curing time can be shortened and the compression set can be improved.

According to the present invention, by contacting the uncured compositions A and B with each other and curing them in this state, a rubber laminate having the cured fluororubber and cured epichlorohydrin rubber bonded firmly to each other can be obtained, and the cost and low-temperature characteristics can be highly improved, while retaining excellent performances of the fluororubber.

The rubber laminate of the present invention is especially excellent in resistance to gasoline, particularly the resistance to sour gasoline. Accordingly, by utilizing this excellent property, the laminate of the present invention can be used as a hose material for a fuel oil and a diaphragm. Moreover, the rubber laminate of the present invention can be used as various rubber parts excellent in oil resistance and chemical resistance.

The present invention will now be described in detail with reference to the following examples.

In the examples and comparative examples, all of "parts" and "%" are by weight, unless otherwise stated.

Example 1

Each of an uncured composition B shown in Table 1 and an uncured composition A shown in Table 2 was kneaded by a 6-inch open roll to form a sheet having a uniform thickness of about 2 mm.

Then, each sheet was cut into a strip having a size of 6 cm × 10 cm, and a test piece of a laminate was prepared by laminating a combination of strips shown in Table 3 and curing and bonding the laminate under a pressing pressure of 40 kg/cm$^2$ at 170° C. for 15 minutes. Cellophane paper was interposed between the portions to be gripped by a chuck in the peeling test so that both the sheets were not bonded.

Then, the peeling test was carried out at a pulling speed of 50 mm/min to measure the peel strength according to the method of JIS K-6301.

The obtained results are shown in Table 3.

From the results shown in Table 3, it is evident that the fluororubber is bonded to the epichlorohydrin rubber with a strong bonding force.

TABLE 1

| Recipe (parts by weight) | C1 | C2 | C3 | C4 | C5 | C6 |
|---|---|---|---|---|---|---|
| epichlorohydrin rubber *1 | 100 | 100 | — | — | — | — |
| epichlorohydrin rubber *2 | — | — | 100 | — | — | — |
| epichlorohydrin rubber *3 | — | — | — | 100 | — | — |
| epichlorohydrin rubber *4 | — | — | — | — | 100 | 100 |
| stearic acid | 1 | 1 | 1 | 1 | 1 | — |
| sorbitan monostearate | — | — | — | — | — | 3 |
| carbon black (FEF) | 40 | 40 | 40 | 40 | 40 | 40 |
| antioxidant NBC *5 | 1 | 1 | 1 | 1 | 1.5 | 1.5 |
| magnesium oxide | 15 | 15 | 15 | 15 | 15 | 15 |
| tetrabutyl phosphonium benzotriazolate | — | 2 | 2 | 2 | 2 | 2 |
| red lead | 5 | 5 | 5 | 5 | — | — |
| 2-mercaptoimidazoline | 1.2 | 1.2 | 1.2 | 1.2 | — | — |
| 2,4,6-trimercapto-S-triazine | — | — | — | — | — | 0.9 |
| zinc oxide | — | — | — | — | 5 | — |
| sulfur | — | — | — | — | 1 | — |
| promoter TT *6 | — | — | — | — | 1.5 | — |
| promoter CZ *7 | — | — | — | — | 1.5 | — |

Note:
*1 Gechron #3102 (epichlorohydrin/ethylene oxide/allyl glycidyl ether copolymer supplied by Nippon Zeon Co., Ltd.)
*2 Gechron #2000 (epichlorohydrin/ethylene oxide copolymer supplied by Nippon Zeon)
*3 Gechron #1000 (epichlorohydrin polymer supplied by Nippon Zeon)
*4 Zeospan #303 (epichlorohydrin/propylene oxide/allyl glycidyl ether copolymer supplied by Nippon Zeon)
*5 nickel dibutyldithiocarbamate
*6 tetramethylthiuram disulfide
*7 N-cyclohexyl-2-benzothiazole sulfenamide

TABLE 2

| Recipe (parts by weight) | Sample F1 |
|---|---|
| fluororubber *1 | 100 |
| magnesium oxide | 3 |
| calcium hydroxide | 6 |
| carbon black (MT) | 20 |
| promoter Tecnoflon M1 *2 | 3.6 |
| promoter Tecnoflon M2 *3 | 1.6 |

Note:
*1 Tecnoflon NM (supplied by Montefluos, Italy)
*2 supplied by Montefluos, Italy (bisphenol type compound)
*3 supplied by Montefluos, Italy (organic phosphate)

TABLE 3

| | Combination of Uncured Compositions | | |
|---|---|---|---|
| | epichlorohydrin rubber composition | fluororubber composition | Peel Strength (kg/inch) |
| Comparative Example | C1 | F1 | not bonded |
| Example 1 | C2 | F1 | 8.8 |
| | C3 | F1 | 8.4 |
| | C4 | F1 | 9.1 |
| | C5 | F1 | 8.4 |
| | C6 | F1 | 8.3 |

Example 2

According to the same procedures as those described in Example 1, an uncured composition B shown in Table 4 and an uncured composition A shown in Table 2 were kneaded and test pieces were prepared therefrom to measure the peel strength.

The obtained results are shown in Table 5. From the results shown in Table 5, it is evident that, when a specific phosphonium salt is incorporated in an amount of at least 1.0 part by weight in the epichlohydrin rubber and a metal oxide is incorporated in the fluororubber, a rubber laminate in which the epichlorohydrin rubber is cure-bonded firmly to the fluororubber can be obtained.

TABLE 4

| Recipe (parts by weight) | C7 | C8 | C9 | C10 | C11 | C12 | C13 | C14 |
|---|---|---|---|---|---|---|---|---|
| epichlorohydrin rubber *1 | 100 | 100 | 100 | 100 | — | — | — | — |
| epichlorohydrin rubber *4 | — | — | — | — | 100 | 100 | 100 | 100 |

TABLE 4-continued

| Recipe (parts by weight) | Sample | | | | | | | |
|---|---|---|---|---|---|---|---|---|
| | C7 | C8 | C9 | C10 | C11 | C12 | C13 | C14 |
| stearic acid | 1 | 1 | 1 | 1 | 1 | 1 | 1 | 1 |
| carbon black (FEF) | 40 | 40 | 40 | 40 | 40 | 40 | 40 | 40 |
| antioxidant NBC | 1 | 1 | 1 | 1 | 1.5 | 1.5 | 1.5 | 1.5 |
| magnesium oxide | 15 | 15 | 15 | 15 | 15 | 15 | 15 | 15 |
| tetrabutyl phosphonium benzotriazolate | — | 1 | 2 | 3 | — | 1 | 2 | 3 |
| red lead | 5 | 5 | 5 | 5 | — | — | — | — |
| 2-mercaptoimidazoline | 1.2 | 1.2 | 1.2 | 1.2 | — | — | — | — |
| zinc oxide | — | — | — | — | 5 | 5 | 5 | 5 |
| sulfur | — | — | — | — | 1 | 1 | 1 | 1 |
| promoter TT *6 | — | — | — | — | 1.5 | 1.5 | 1.5 | 1.5 |
| promoter CZ *7 | — | — | — | — | 1.5 | 1.5 | 1.5 | 1.5 |

Note:
*1, *4, *6 and *7: same as in Table 1

TABLE 5

| | Combination of Uncured Compositions | | |
|---|---|---|---|
| | epichloro-hydrin rubber composition | fluororubber composition | Peel Strength (kg/inch) |
| Comparative Example | C7 | F1 | not bonded |
| | C11 | F1 | not bonded |
| Example 2 | C8 | F1 | 8.4 |
| | C9 | F1 | 8.8 |
| | C10 | F1 | 9.3 |
| | C12 | F1 | 4.4 |
| | C13 | F1 | 8.4 |
| | C14 | F1 | 9.7 |

What is claimed is:

1. A process for the preparation of rubber laminates, which comprises contacting an uncured composition A comprising a fluororubber and a metal oxide with an uncured composition B comprising an epichlorohydrin rubber and a phosphonium salt represented by the following general formula:

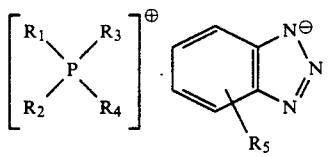

wherein $R_1$, $R_2$, $R_3$ and $R_4$ each stand for a hydrocarbon residue having 1 to 20 carbon atoms, which may be substituted, with the proviso that up to three of $R_1$, $R_2$, $R_3$ and $R_4$ may be primary, secondary or tertiary amino group of a fluoroalkyl group, and $R_5$ stands for a hydrogen atom or an alkyl group having 1 to 20 carbon atoms and a curing agent selected from the group consisting of imidazoline compound, and mercapto-s-triazine compound, and curing the uncured compositions.

2. A process for the preparation of rubber laminates according to claim 1, wherein the fluororubber is a rubber selected from the group consisting of homopolymer rubbers of fluorine-containing unsaturated monomers, copolymer rubbers of fluorine-containing unsaturated monomers and copolymer rubbers of fluorine-containing unsaturated monomers with other unsaturated monomers copolymerizable therewith.

3. A process for the preparation of rubber laminates according to claim 1, wherein the fluororubber is a rubber selected from the group consisting of vinylidene fluoride/hexafluoropropene binary copolymer rubbers and vinylidene fluoride/hexafluoropropene/tetrafluoroethylene terpolymers.

4. A process for the preparation of rubber laminates according to claim 1, wherein the metal oxide is a compound selected from the group consisting of CaO, MgO, PbO, $Pb_3O_4$, BaO and $Al_2O_3$.

5. A process for the preparation of rubber laminates according to claim 1, wherein the metal oxide is MgO.

6. A process for the preparation of rubber laminates according to claim 1, wherein the metal oxide is incorporated in the uncured composition A in an amount of 1 to 30 parts by weight per 100 parts by weight of the fluororubber.

7. A process for the preparation of rubber laminates according to claim 1, wherein the epichlorohydrin rubber is a rubber selected from the group consisting of epichlorohydrin homopolymer rubbers and copolymer rubbers of epichlorohydrin with other epoxides.

8. A process for the preparation of rubber laminates according to claim 7, wherein the copolymer rubber of epichlorohydrin with other epoxide is a copolymer rubber selected from the group consisting of an epichlorohydrin/ethylene oxide copolymer rubber, an epichlorohydrin/allyl glycidyl ether copolymer rubber and an epichlorohydrin/ethylene oxide/allyl glycidyl ether terpolymer rubber.

9. A process for the preparation of rubber laminates according to claim 7, wherein the copolymer rubber of epichlorohydrin with other epoxide is a copolymer rubber selected from the group consisting of an epichlorohydrin/propylene oxide copolymer rubber, an epichlorohydrin/propylene oxide/allyl glycidyl ether terpolymer rubber and an epichlorohydrin/propylene oxide/ethylene oxide/allyl glycidyl ether quaternary copolymer rubber.

10. A process for the preparation of rubber laminates according to claim 1, wherein the hydrocarbon residue is a group selected from the group consisting of alkyl groups, cycloalkyl groups, aralkyl groups, aryl groups and substituted aryl groups.

11. A process for the preparation of rubber laminates according to claim 1, wherein the secondary and tertiary amino groups in the primary, secondary and tertiary amino groups are selected from the group consisting of methylamino, ethylamino, anilino, dimethylamino and diethylamino groups.

12. A process for the preparation of rubber laminates according to claim 1, wherein the fluoroalkyl group is selected from the group consisting of trifluoromethyl, tetrafluoropropyl and octafluoropentyl groups.

13. A process for the preparation of rubber laminates according to claim 1, wherein $R_5$ is an alkyl group selected from the group consisting of methyl, ethyl, butyl, ethylhexyl and dodecyl groups.

14. A process for the preparation of rubber laminates according to claim 1, wherein the phosphonium salt is incorporated in the uncured composition B in an amount of 0.5 to 10 parts by weight per 100 parts by weight of the epichlorohydrin rubber.

15. A process for the preparation of rubber laminates according to claim 1, wherein the metal oxide is further incorporated in the uncured composition B.

16. A process for the preparation of rubber laminates according to claim 15, wherein the metal oxide is MgO.

17. A process as claimed in claim 1 wherein each of said compositions A and B are in the form of a shaped article.

18. A process as claimed in claim 17 wherein said shaped articles are films.

19. An uncured shaped article comprising a first layer comprising a fluororubber and a metal oxide juxtaposed a second layer comprising an epichlorohydrin rubber and a phosphonium salt represented by the following general formula:

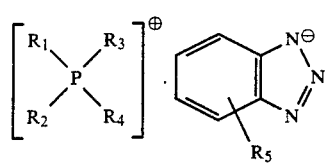

wherein $R_1$, $R_2$, $R_3$ and $R_4$ each stand for a hydrocarbon residue having 1 to 20 carbon atoms, which may be substituted, with the proviso that up to three of $R_1$, $R_2$, $R_3$ and $R_4$ may be primary, secondary or tertiary amino group or a fluoroalkyl group, and $R_5$ stands for a hydrogen atom or an alkyl group having 1 to 20 carbon atoms and a curing agent selected from the group consisting of imidazoline compound, and mercapto-s-triazine compound.

20. A shaped article comprising the cured laminate formed by curing the article claimed in claim 19.

21. The article as claimed in claim 19 in the shape of a film.

22. The article as claimed in claim 19 in the shape of a hose.

23. The article as claimed in claim 20 in the shape of a film.

24. The article as claimed in claim 20 in the shape of a hose.

* * * * *